(12) United States Patent
Hrubant et al.

(10) Patent No.: US 10,190,325 B2
(45) Date of Patent: Jan. 29, 2019

(54) CARGO FLOOR BRACE TOOL

(71) Applicant: The Boeing Company, Chicago, IL (US)

(72) Inventors: Kurt P. Hrubant, Bonney Lake, WA (US); William R. White, Seattle, WA (US)

(73) Assignee: The Boeing Company, Chicago, IL (US)

( * ) Notice: Subject to any disclaimer, the term of this patent is extended or adjusted under 35 U.S.C. 154(b) by 53 days.

(21) Appl. No.: 15/235,550

(22) Filed: Aug. 12, 2016

(65) Prior Publication Data
US 2018/0044928 A1 Feb. 15, 2018

(51) Int. Cl.
E04G 1/00 (2006.01)
B64F 5/00 (2017.01)
E04G 3/20 (2006.01)
E04G 3/24 (2006.01)
E04G 5/02 (2006.01)
E04G 1/15 (2006.01)
E04G 5/06 (2006.01)
E06C 5/00 (2006.01)
(Continued)

(52) U.S. Cl.
CPC .......... E04G 3/20 (2013.01); B64F 5/00 (2013.01); E04G 1/15 (2013.01); E04G 3/246 (2013.01); E04G 5/02 (2013.01); E04G 5/062 (2013.01); E06C 5/00 (2013.01); F16B 47/00 (2013.01); B25B 11/007 (2013.01)

(58) Field of Classification Search
CPC ..... A47L 1/00; A47L 1/02; A47L 1/03; A47L 1/05; A47L 3/00; A47L 3/02; E04G 3/22; E04G 3/20; E04G 3/246; E04G 5/02; E04G 1/15; B64F 5/00; E06C 5/00; F16B 47/00; B25B 11/007
See application file for complete search history.

(56) References Cited

U.S. PATENT DOCUMENTS 2,315,202 A * 3/1943 Haseltine ............... B61D 17/10
                                                     105/375
4,592,526 A * 6/1986 Kobelt ..................... F16C 11/10
                                                     248/284.1
(Continued)

FOREIGN PATENT DOCUMENTS

FR    1121612    8/1956
JP    S5177801    6/1976

OTHER PUBLICATIONS

Extended European Search Report dated Dec. 19, 2017 in co-pending European Patent Application No. 17176797.3.

Primary Examiner — Daniel P Cahn
(74) Attorney, Agent, or Firm — Joseph M. Rolnicki; Evans & Dixon, L.L.C.

(57) ABSTRACT

A brace tool comprises a rigid frame, a platform mounted on the frame for adjustable positioning of the platform relative to the frame, and a plurality of suction cups. The plurality of suction cups can be removably attached to a flat surface that is adjacent to an inclined surface 12 above which work is to be performed. The platform can be adjustably positioned relative to the frame 22, and then secured in its adjusted position. The platform can then be used as a brace that can be engaged by the person on the inclined surface that is performing the overhead work and prevent the person from sliding down the inclined surface.

15 Claims, 13 Drawing Sheets

(51) Int. Cl.
*F16B 47/00* (2006.01)
*B25B 11/00* (2006.01)

(56) References Cited

U.S. PATENT DOCUMENTS

| | | | | |
|---|---|---|---|---|
| 4,930,183 | A * | 6/1990 | Owens | E04H 15/48 |
| | | | | 16/260 |
| 5,429,333 | A | 7/1995 | Klein | |
| 5,971,106 | A * | 10/1999 | Brown | E06C 1/36 |
| | | | | 182/127 |
| 6,406,002 | B1 * | 6/2002 | Hardy, III | E01F 13/022 |
| | | | | 256/23 |
| 7,036,629 | B2 * | 5/2006 | Nicolaysen | E04G 3/265 |
| | | | | 182/45 |
| 7,270,357 | B1 * | 9/2007 | Liao | B65G 7/12 |
| | | | | 294/15 |
| 7,316,604 | B1 * | 1/2008 | Burks | B24B 19/26 |
| | | | | 451/354 |
| 2004/0218997 | A1 * | 11/2004 | Neubauer | B66F 11/04 |
| | | | | 414/11 |
| 2007/0189882 | A1 * | 8/2007 | Smith | B66F 9/0655 |
| | | | | 414/340 |
| 2008/0001047 | A1 * | 1/2008 | Madison | B60R 11/00 |
| | | | | 248/205.5 |
| 2008/0169153 | A1 * | 7/2008 | O'Connor | E04H 4/144 |
| | | | | 182/93 |
| 2009/0200110 | A1 * | 8/2009 | Esselborn | E06C 7/46 |
| | | | | 182/107 |
| 2009/0224117 | A1 * | 9/2009 | Kaneda | F16B 47/00 |
| | | | | 248/206.3 |
| 2010/0192368 | A1 * | 8/2010 | Kramer | E04G 23/0218 |
| | | | | 29/824 |
| 2010/0288893 | A1 * | 11/2010 | Tan | F16B 47/00 |
| | | | | 248/205.5 |
| 2010/0307869 | A1 * | 12/2010 | Hazuka, II | E04G 3/26 |
| | | | | 182/141 |
| 2011/0139732 | A1 * | 6/2011 | Cabanban | A47G 29/087 |
| | | | | 211/13.1 |
| 2011/0180333 | A1 * | 7/2011 | Niederberger | B08B 1/00 |
| | | | | 180/8.6 |
| 2011/0284327 | A1 * | 11/2011 | Crayton | E04G 3/24 |
| | | | | 182/150 |
| 2012/0168251 | A1 * | 7/2012 | Baxter | B66C 23/205 |
| | | | | 182/129 |
| 2012/0180424 | A1 * | 7/2012 | Hinshaw | E04B 1/26 |
| | | | | 52/745.02 |
| 2012/0199416 | A1 * | 8/2012 | Hopkins | E06C 7/42 |
| | | | | 182/111 |
| 2013/0193909 | A1 * | 8/2013 | Blevins | F16M 11/10 |
| | | | | 320/107 |
| 2014/0054338 | A1 * | 2/2014 | Casagrande | B60R 11/02 |
| | | | | 224/275 |
| 2016/0252349 | A1 * | 9/2016 | Egan | F16M 11/32 |
| | | | | 33/413 |
| 2017/0050764 | A1 * | 2/2017 | Caul, III | F16B 47/00 |
| 2017/0066370 | A1 * | 3/2017 | Bowe | B60Q 1/2615 |
| 2017/0209798 | A1 * | 7/2017 | Yang | B62D 55/265 |
| 2018/0011050 | A1 * | 1/2018 | Dunn | B23K 37/04 |

* cited by examiner

CARGO FLOOR BRACE TOOL

FIELD

This disclosure is directed to a tool that is removably attachable to a flat surface adjacent an inclined surface. The tool is used as a brace that can be engaged by a person on the inclined surface to prevent the person from sliding down the inclined surface.

BACKGROUND

In various different work environments, for example in work being done by a person 10 inside an aircraft, it is necessary that the person 10 support themself against an inclined surface 12 adjacent a separate surface 14 the person is standing on when performing work above the inclined surface. This work environment is represented in FIG. 1. In such a word environment, the person 10 performing the overhead work above the inclined surface 12 often find themself constantly sliding down the inclined surface 12 while attempting to perform the overhead work above the inclined surface 12. This in turn requires that the person 10 constantly reposition themself on the inclined surface 12 to continue performing the overhead work above the inclined surface 12. The person's repeated sliding down the inclined surface 12 and then repositioning themself on the inclined surface 12 to continue with the overhead work can quickly fatigue the person 10, can cause muscle and joint strains, often requires the person 10 to position themself in an ergonomic improper posture, and adds time to completing the overhead work.

SUMMARY

The brace tool of this disclosure is constructed in two slightly different embodiments. Each embodiment is designed to support a person on an inclined surface while performing overhead work above an inclined surface and prevent the person from sliding down the inclined surface.

The brace tool includes a rigid frame. The frame is constructed of materials that provide the frame with sufficient strength to support the weight of a person on the frame. The frame has a top and a bottom on opposite sides of the frame.

A plurality of suction cups are secured to the bottom of the frame. In one construction of the brace tool, three suction cups are secured to the bottom of the frame. The three suction cups are locking suction cups. The locking suction cups each have a handle that is manually moveable between a locking position where the suction cup is secured to a flat surface, and an unlocking position where the suction cup can be removed from the flat surface.

A shaft is provided on the top of the frame. The shaft has a cylindrical exterior surface and extends across the top of the frame between two of the three suction cups.

A platform is mounted on the shaft. The platform is moveable on the shaft and can be rotated or moved in an arc around the shaft. The platform can be adjustably positioned around the shaft to a desired orientation of the platform relative to the frame, and then firmly secured to the shaft to prevent the platform from moving from the desired orientation of the platform relative to the frame.

In the method of using the brace tool, the tool is positioned on a flat surface adjacent an inclined surface above which overhead work is to be performed. Typically, the tool is positioned adjacent the inclined surface with the length of the platform substantially parallel with the length of the inclined surface and perpendicular to the inclination of the inclined surface.

The orientation of the platform can then be adjusted relative to the frame and the inclined surface. With the platform adjusted to a desired orientation relative to the frame and the inclined surface, the platform is secured to the shaft against further movement of the platform.

The suction cups are then secured to the flat surface by manipulating the handle of each suction cup. Typically, the suction cups are secured to the flat surface in close proximity to the intersection of the flat surface and the inclined surface.

The person using the brace tool to perform the overhead work above the inclined surface can then stand on the platform or otherwise support themself on the platform and on the inclined surface to perform the overhead work. The platform secured to the flat surface adjacent the inclined surface prevents the person from sliding down the inclined surface while performing the overhead work.

In a second embodiment of the brace tool, the brace tool includes a first rigid frame and a second rigid frame. The first and second rigid frames are substantially identical and are constructed in the same manner as the rigid frame of the first described embodiment.

Both the first and second rigid frames have pluralities of suction cups secured to the bottoms of the frames. In one construction of the second brace tool, three suction cups are secured to the bottom of each frame. As in the first described embodiment of the brace tool, the three suction cups secured to each frame are locking suction cups.

A shaft is provided on the top of each frame. Each shaft has a cylindrical exterior surface and extends across the top of each frame between two of the three suction cups secured to each frame.

A platform is mounted on the shaft of each frame. The platform has a length that is substantially longer than the length of the platform of the first described brace tool. With the platform mounted on the shaft of each frame, the shafts are positioned coaxially under the platform. The platform can be adjustably positioned around the coaxial shafts of the two frames to a desired orientation of the platform relative to the two frames, and then firmly secured to the shafts of the two frames to prevent the platform from moving from the desired orientation of the platform relative to the two frames.

The method of using this second embodiment of the brace tool is substantially the same as that of the first embodiment of the brace tool. The tool is positioned on a flat surface adjacent an inclined surface above which overhead work is to be performed.

The orientation of the platform relative to the two frames and the inclined surface can then be adjusted. With the platform adjusted to a desired orientation to the two frames and the inclined surface, the platform is secured to each shaft of the two frames against further movement of the platform.

The suction cups of each frame are then secured to the flat surface by manipulating the handle of each suction cup.

The person using the brace tool to perform the overhead work above the inclined surface can then stand on the platform or otherwise support themself on the platform and on the inclined surface to perform the overhead work. The platform secured to the flat surface adjacent the inclined surface prevents the person from sliding down the inclined surface while performing the overhead work. Additionally, due to the increased length of the platform extending between the two frames, the person performing the overhead work can move along the length of the platform to perform the work at different locations above the length of the platform.

In the above manner, the brace tool eliminates the person performing the overhead work above the inclined surface from constantly sliding down the inclined surface. The brace tool also eliminates the constant repositioning of the person performing the overhead work above the inclined surface. The brace thereby provides an ergonomically comfortable environment for performing overhead work above an inclined surface and reduces the time required for performing the overhead work.

The features, functions, and advantages that have been discussed can be achieved independently in various embodiments or may be combined in yet other embodiments, further details of which can be seen with reference to the following description and drawings.

DESCRIPTION

Figure 1:
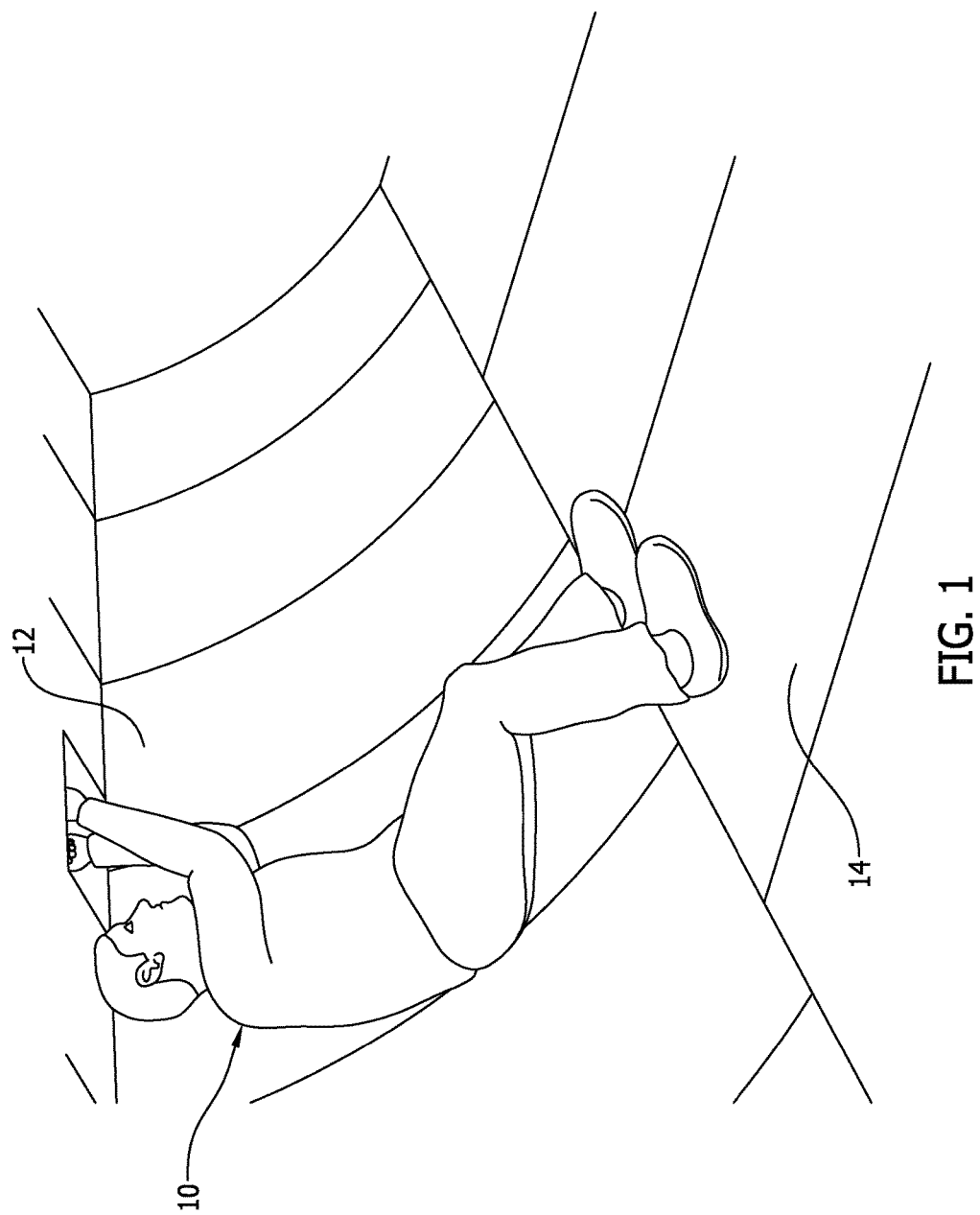
FIG. 1 is a representation of a person performing overhead work above an inclined surface, for example, performing overhead work above a side wall of a cargo hold of an aircraft.

A first embodiment of the brace tool 22 is represented in FIGS. 3-6. The brace tool 22 includes a rigid frame 24.

The frame 24 is constructed of materials that provide the frame with sufficient strength to support the weight of a person on the frame. As represented in FIGS. 3-6, the frame 24 has a general triangular configuration. More specifically, the frame 24 has a general equilateral triangular configuration with a first apex end 26, a second apex end 28 and a third apex end 32. The first apex end 26, the second apex end 28 and the third apex end 32 of the frame each have circular configurations.

A first bar 34 and a second bar 36 are provided on a top of the frame 24. As represented in the drawing figures, the first bar 34 has an elongate, straight configuration and connects a top of the first apex end 26 of the frame to a top of the second apex end 28 of the frame. The second bar 36 also has an elongate, straight configuration and connects a top of the second apex end 28 of the frame to a top of the third apex end 32 of the frame.

A shaft 38 is also provided on the frame 24. The shaft 38 has a cylindrical exterior surface 42 and a cross-section configuration that is larger than the cross-section configurations of the first bar 34 and the second bar 36. The shaft 38 extends between the top surface of the first apex end 26 of the frame and the top surface of the third apex end 32 of the frame. With the shaft 38 having a larger cross-section configuration than the first bar 34 and second bar 36, the shaft 38 has a stronger, more rigid construction than the first bar 34 and the second bar 36.

Although the frame 24 as represented in the drawing FIGS. 3-6 has a general, triangular configuration, the frame could have other configurations. For example, the frame could be rectangular, or could have a general Y shaped configuration.

A plurality of suction cups 52, 54, 56 are secured to the bottom of the frame. In the construction of the brace tool 22 represented in FIGS. 3-6, there are three suction cups 52, 54, 56. In alternative constructions of the brace tool 22, fewer suction cups could be employed or more suction cups could be employed. The three suction cups 52, 54, 56 are conventional locking type suction cups. The three suction cups 52, 54, 56 are secured to the frame 24 beneath the respective first apex end 26, second apex end 28 and third apex end 32 of the frame. Each of the suction cups 52, 54, 56 has a respective manual handle 62, 64, 66. The manual handle 62, 64, 66 of the respective suction cups 52, 54, 56 can be manually manipulated between locked positions where each of the suction cups 52, 54, 56 exerts a suction force on a flat surface engaged by the suction cup and secures the suction cup to the flat surface, and an unlocked position where each of the suction cups 52, 54, 56 are released from the flat surface.

The brace tool 22 also includes a platform 72, the platform 72 is constructed of a rigid material that provides the platform with sufficient strength to support the weight of a person on the platform. The platform 72 is represented in drawing FIGS. 3-6 as having a rectangular configuration with top, brace surface 74 and an opposite bottom surface 76. The top surface 74 and bottom surface 76 are substantially flat and planar and are parallel to each other. A non-slip surface is provided on the top surface 74, for example a knurled surface. The top surface 74 is provided with length and width dimensions that enable a person using the brace tool 22 to easily sit, kneel, stand or in some manner support themself on the top surface 74.

A first support block 82 is secured to the bottom surface 76 of the platform 72 and mounts the platform 72 to the shaft 38 of the frame 24. The first support block 82 is constructed of rigid material similar to that of the platform 72. The first support block 82 has a base 84 that is secured to the bottom surface 76 of the platform 72 and thus secures the first support block 82 to the platform. The base 84 of the first support block 82 has a semi-circular surface 86 on an opposite side of the base from the bottom surface 76 of the platform 72.

The first support block 82 also has a cap 88 that is removably attached the base 84. As represented in FIGS. 3-6, the cap 88 is removably attached to the base 84 by threaded fasteners 92. Other means of removably attaching the cap 88 to the base 84 could be employed instead of the fasteners 92. The cap 88 also has a semi-circular surface 94. With the cap 88 removably attached to the base 84, the semi-circular surface 94 of the cap opposes the semi-circular surface 86 of the base. The threaded fasteners 92 that attach the cap 88 to the base 84 enable the cap to be adjustably positioned toward the base by tightening the threaded fasteners 92, or adjustably positioned away from the base 84 by loosening the threaded fasteners 92.

There is also a second support block 82' that is secured to the bottom surface 76 of the platform 72. The second support block 82' has the same construction as the first support block 82. Therefore, the construction of the second support block 82' is not described herein. The component parts of the second support block 82' that correspond to the component parts of the first support block 82 are labeled using the same reference numbers in the description of the first support block 82, with the reference numbers being followed by a prime (').

The platform 72 is mounted on the shaft 38 of the frame 24 by the first support block 82 and the second support block 82'. The constructions of the first support block 82 and the second support block 82' enable the platform 74 to be mounted on the shaft 38 and enable the platform 72 to be adjustably rotated or moved in an arc around the shaft 38. The platform 72 is mounted to the shaft 38 by the semi-circular surfaces 86, 86' of the respective first support block base 84 and second support block base 84' engaging around one side of the shaft 38 and the semi-circular surfaces 94, 94' of the respective first support block cap 88 and second support block cap 88' engaging around the opposite side of the shaft 38. By adjusting the threaded fasteners 92, 92' to where the semi-circular surfaces 86, 86' of the first support block base 84 and second support block base 84' and the semi-circular surfaces 94, 94' of the caps 88, 88' engage loosely against the shaft 38, the platform 72 can be adjustably positioned relative to the frame 24 by moving the platform 72 in rotation or in an arc around the shaft 38. When the platform 72 is at its desired orientation relative to the frame 24, the threaded fasteners 92, 92' are then tightened. This firmly secures the semi-circular surfaces 86, 86' of the first support block base 84 and second support block base 84' and the semi-circular surfaces 94, 94' of the first support block cap 88 and the second support block cap 88' around the shaft 38. This firmly secures the platform 72 at its desired orientation relative to the frame 24.

Figure 13:
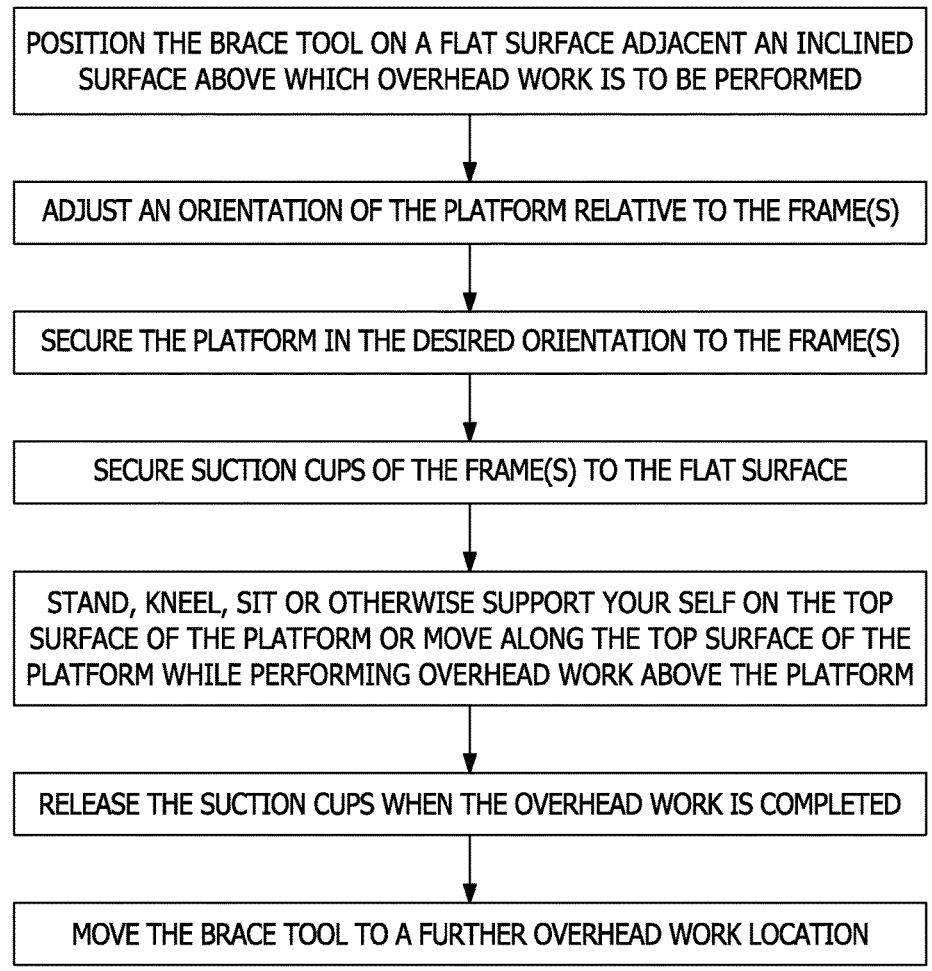
FIG. 13 is a representation of a method of using the brace tool.

FIG. 13 represents a method of using the brace tool 22. In using the brace tool 22, the platform 72 is first adjustably moved to a desired orientation relative to the frame 24. The platform 72 is then secured in the desired orientation relative to the frame 24 by tightening the threaded fasteners 92, 92'.

Figure 2:
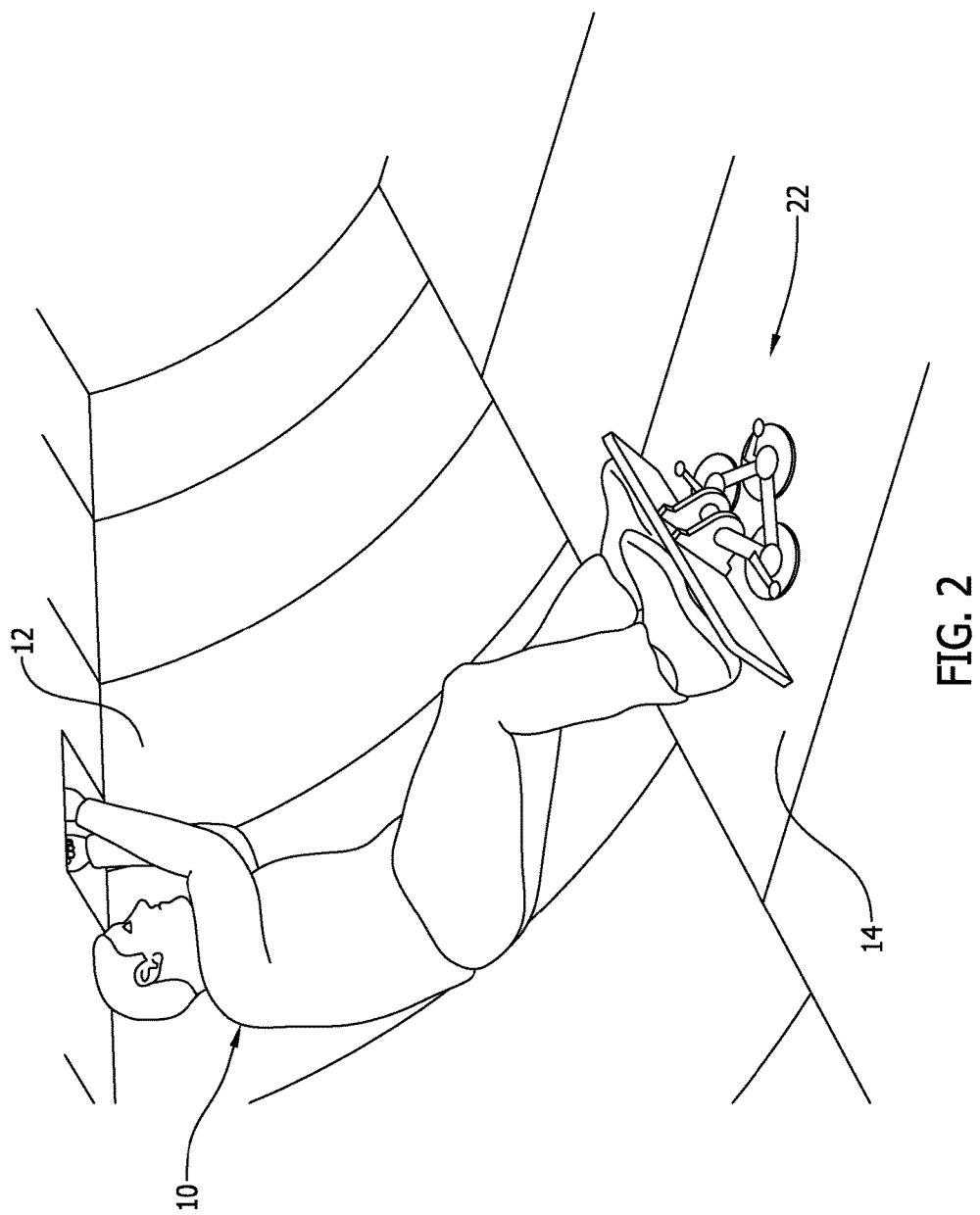
FIG. 2 is a representation similar to that of FIG. 1, showing the person bracing themself on the brace tool of this disclosure preventing the person from sliding down the inclined surface of the cargo hold side wall.
Figure 3:
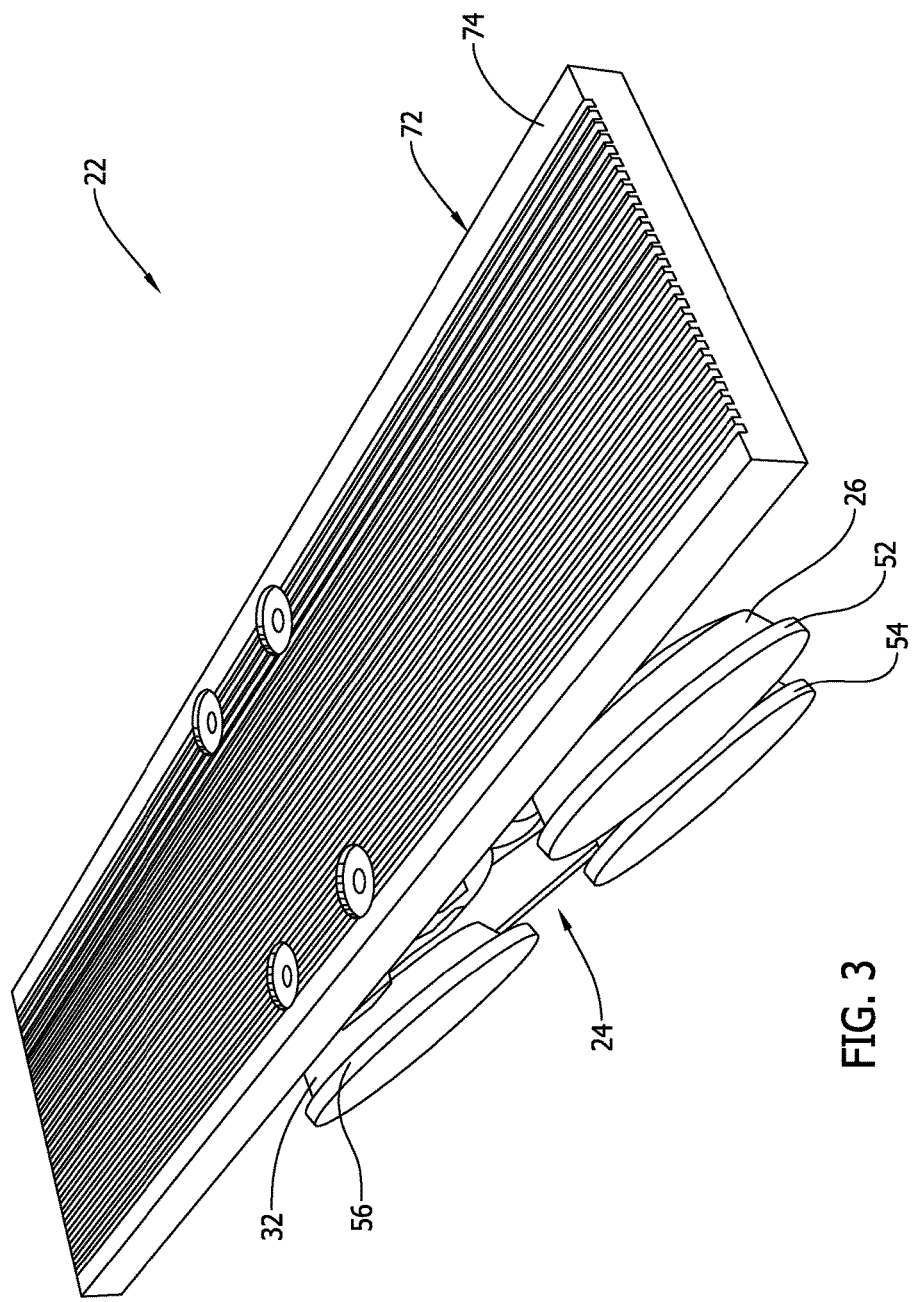
FIG. 3 is a perspective view of the brace tool.
Figure 4:
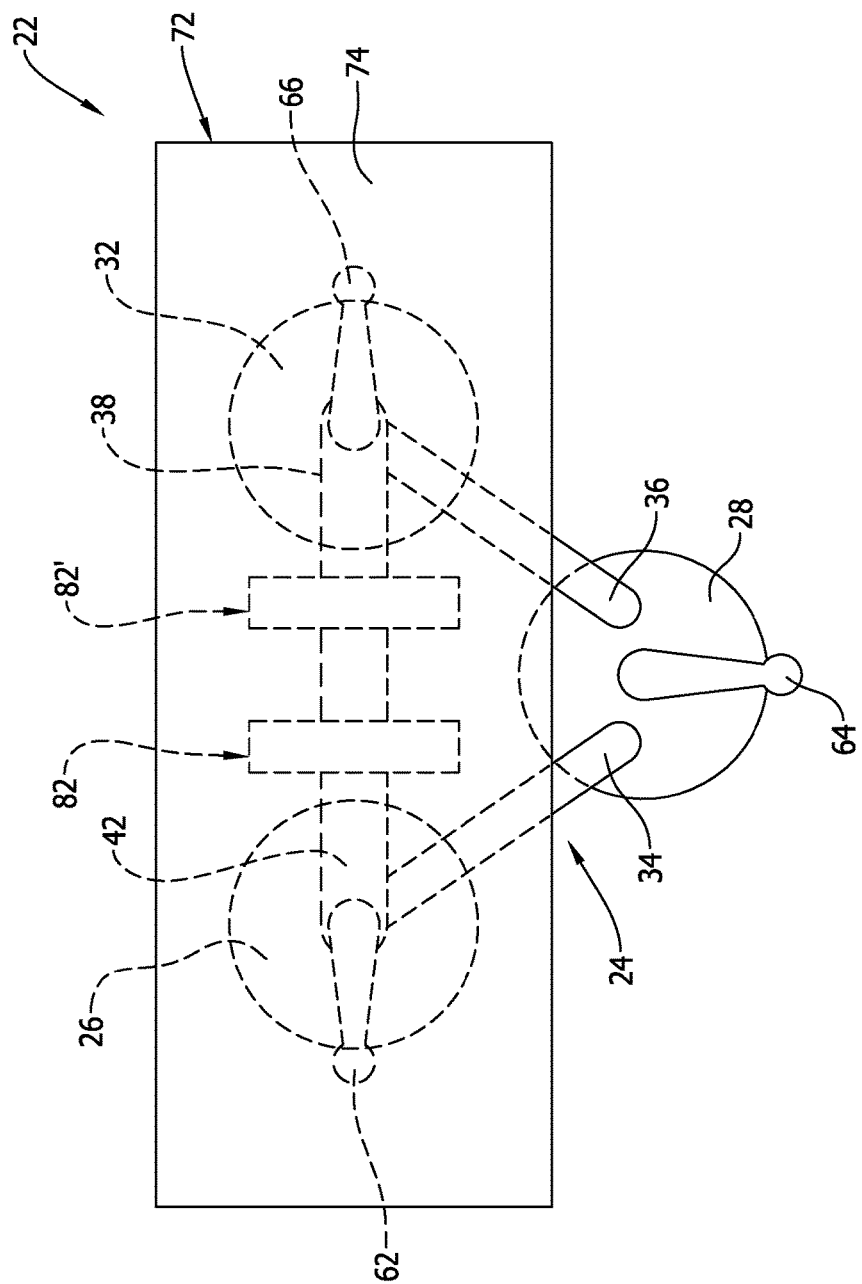
FIG. 4 is a top plan view of the brace tool.
Figure 5:
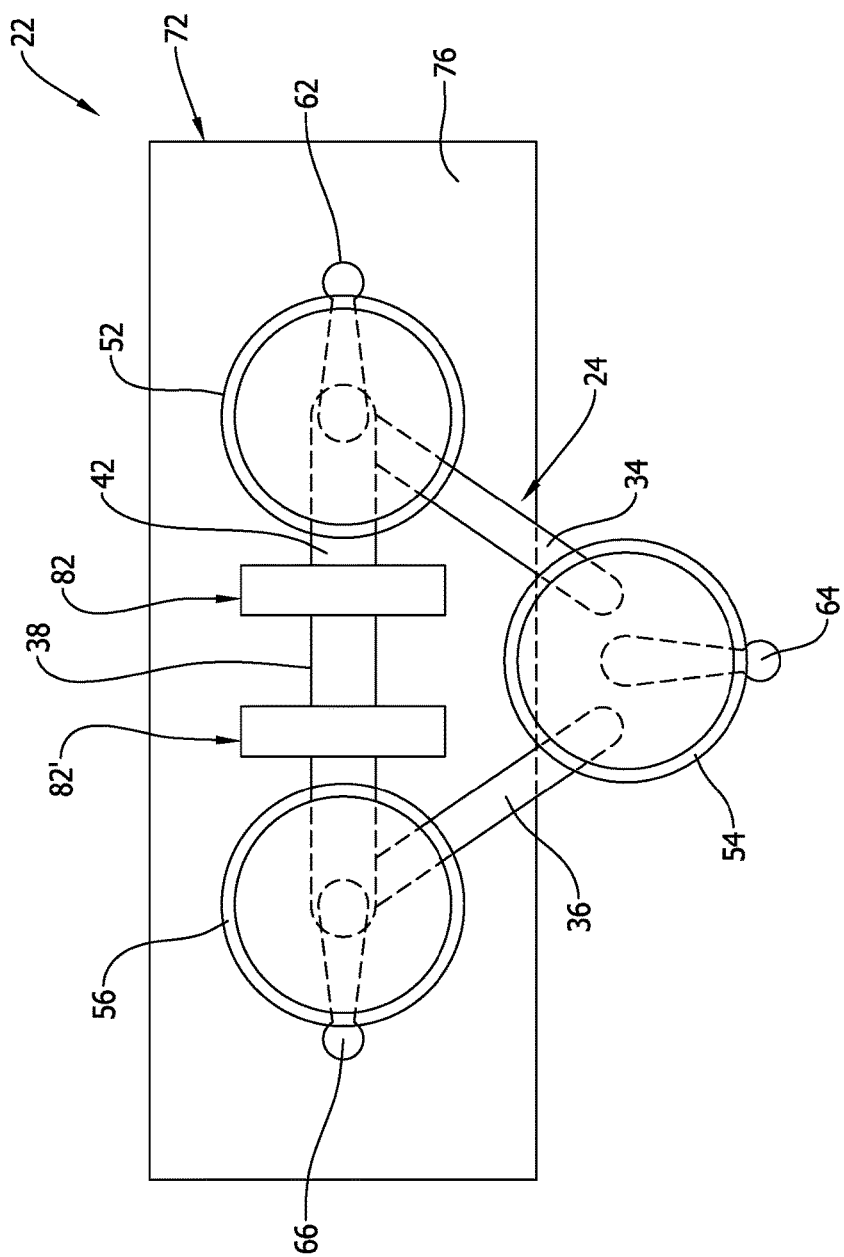
FIG. 5 is a bottom plan view of the brace tool.
Figure 6:
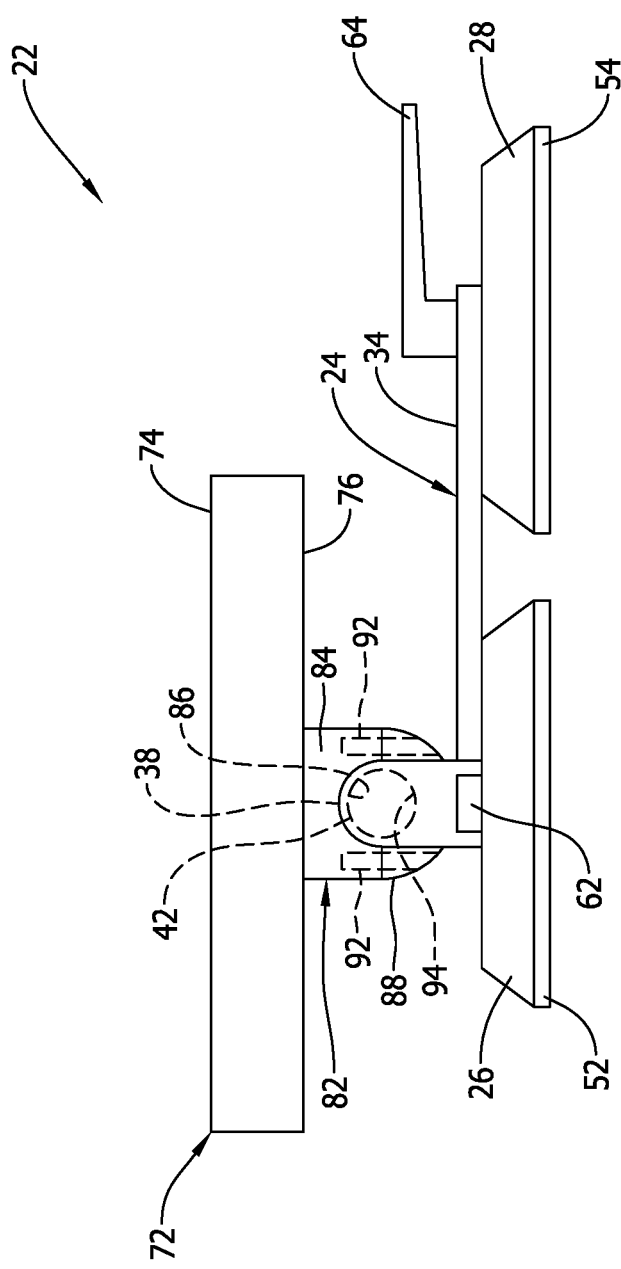
FIG. 6 is a left side elevation view of the brace tool.
Figure 7:
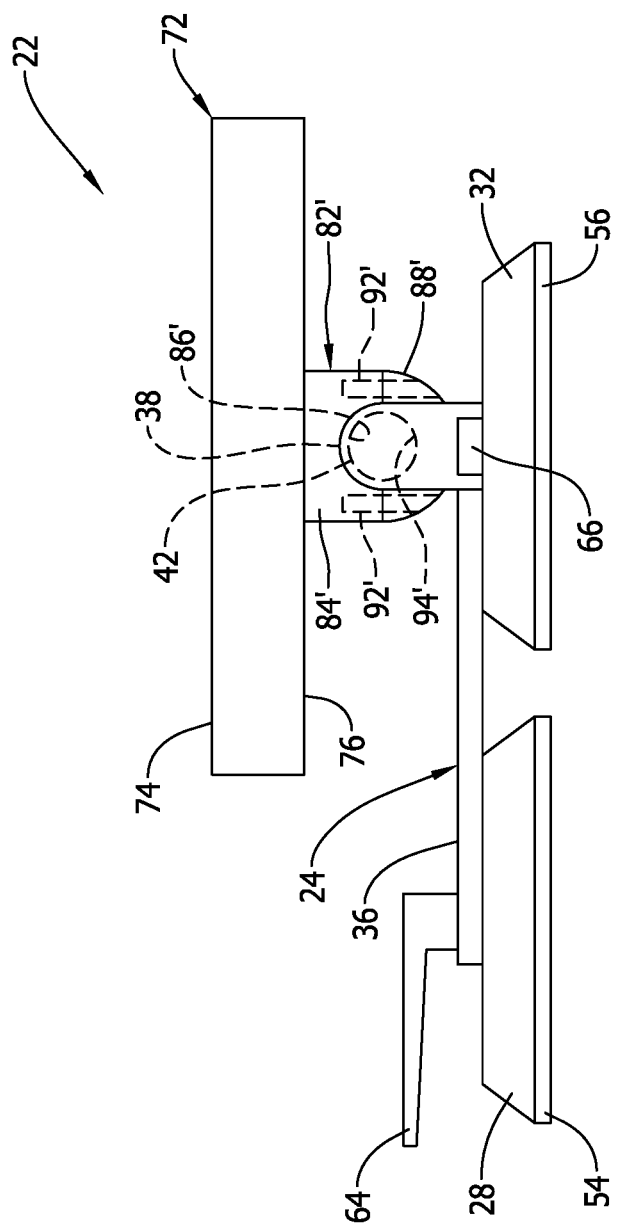
FIG. 7 is a right side elevation view of the brace tool.
Figure 8:
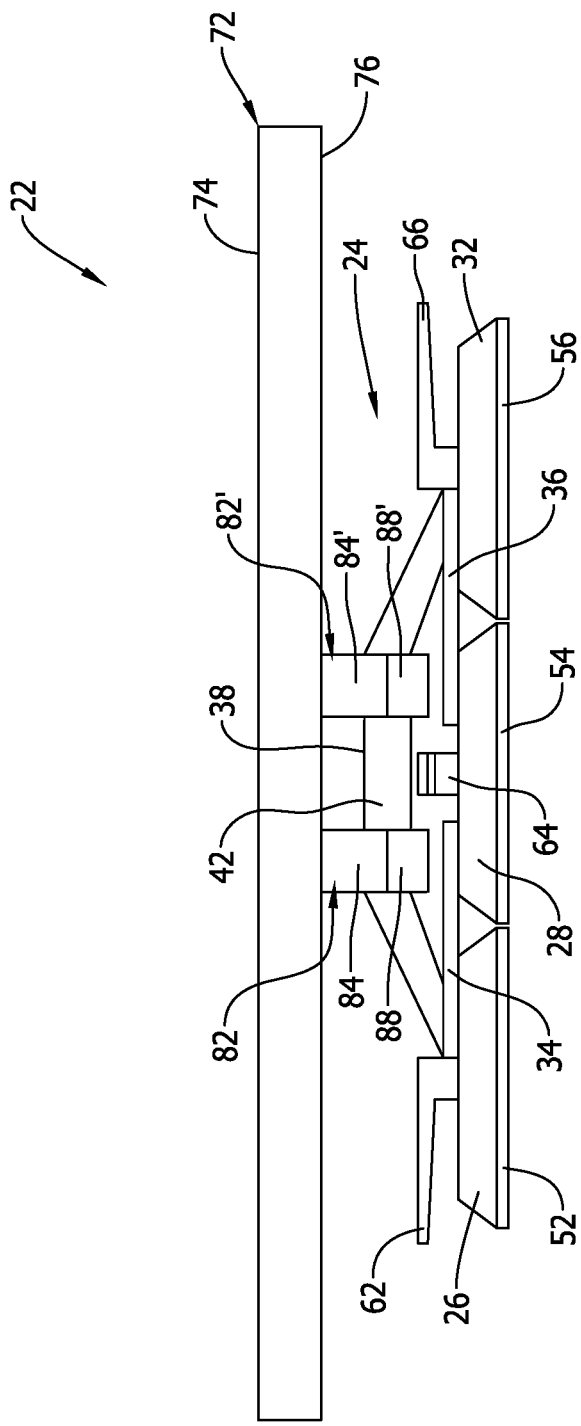
FIG. 8 is a front elevation view of the brace tool.
Figure 9:
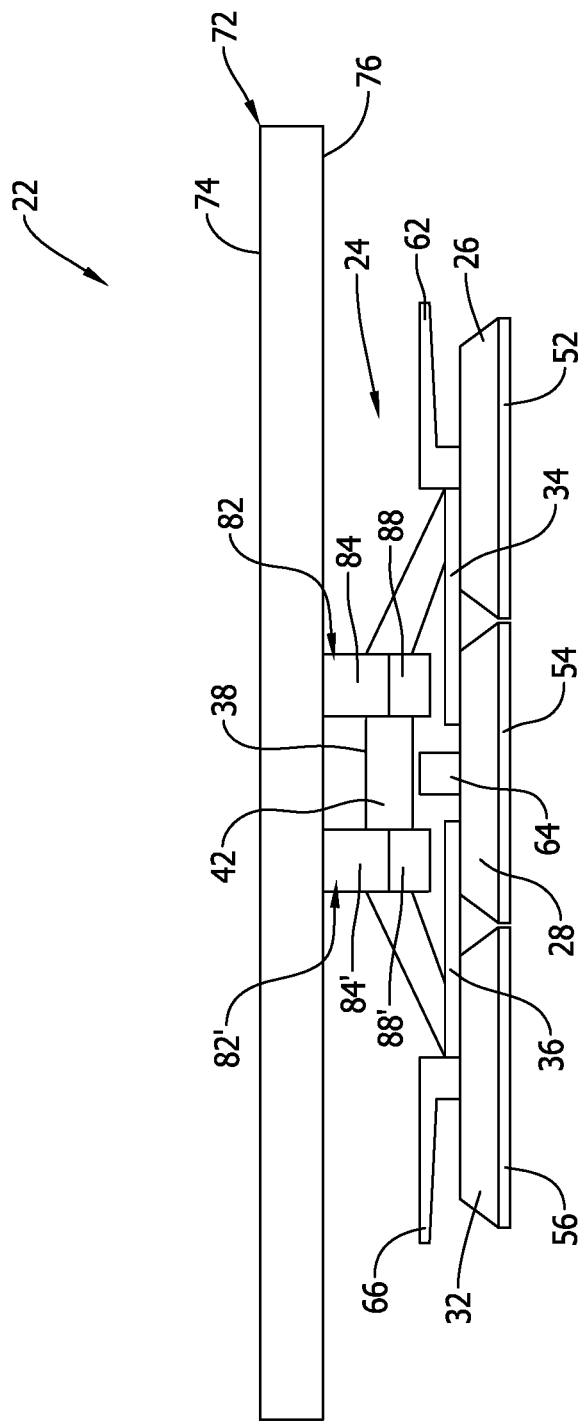
FIG. 9 is a rear elevation view of the brace tool.

The brace tool 22 is then positioned on a flat surface 14 adjacent an inclined surface 12 above which overhead work is to be performed, as represented in FIG. 2. Typically, the brace tool 22 is positioned adjacent the inclined surface 12 with the length of the platform 72 substantially parallel with the length of the inclined surface and perpendicular to the inclination of the inclined surface.

The suction cups 52, 54, 56 are then secured to the flat surface 14 by manually manipulating the respective handles 62, 64, 66 of the suction cups. Typically, the suction cups 52, 54, 56 are secured to the flat surface 14 in close proximity to the intersection of the flat surface 14 with the inclined surface 12.

As an alternative to the above described method of using the brace tool 22, the orientation of the platform 72 relative to the frame 24 can be adjusted after the suction cups 52, 54, 56 are secured to the flat surface 14, rather than before the suction cups 52, 54, 56 are secured to the flat surface 14.

The person 10 using the brace tool 22 to perform the overhead work above the inclined surface 12 can then stand, kneel or sit on the top surface 74 of the platform 72, or otherwise support themself on the platform and on the inclined surface 12 to perform the overhead work. The platform 72 secured to the flat surface 14 adjacent the inclined surface 12 prevents the person 10 from sliding down the inclined surface while performing the overhead work.

When the overhead work is completed, the suction cups 52, 54, 56 can then be released from the flat surface 14 by manipulating their respective handles 62, 64, 66. The brace tool 22 can then be moved to another work location where needed.

In the above manner, the brace tool 22 eliminates the person 10 from constantly sliding down the inclined surface 12 while performing the overhead work above the inclined surface. The brace tool 22 also eliminates the constant repositioning of the person 10 performing the overhead work above the inclined surface 12. The brace tool 22 thereby provides an ergonomically comfortable environment for performing overhead work above an inclined surface 12 and reduces the time required for the overhead work.

Figure 10:
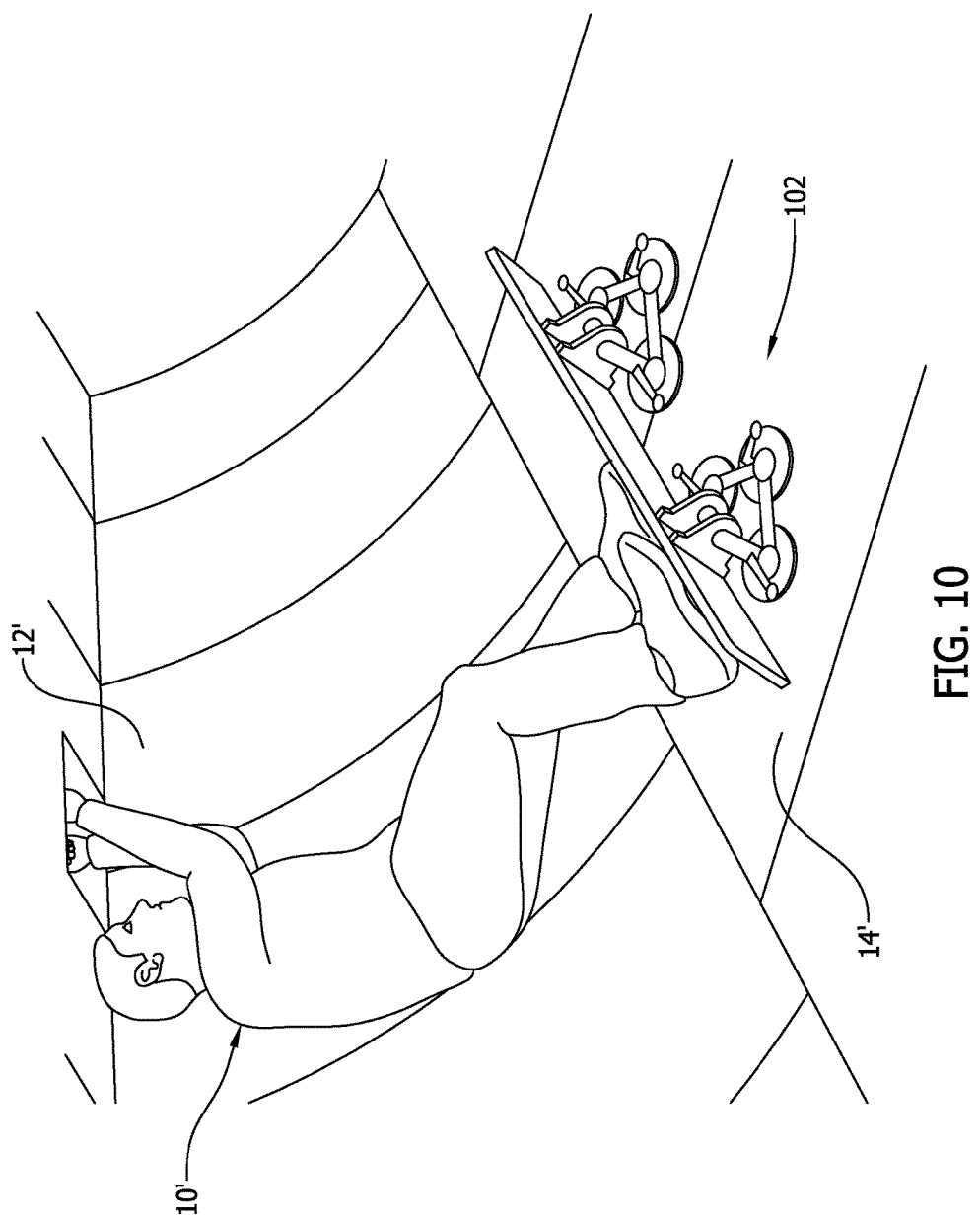
FIG. 10 is a representation similar to that of FIG. 2, showing the person bracing themself on the second embodiment of the brace tool of this disclosure.
Figure 11:
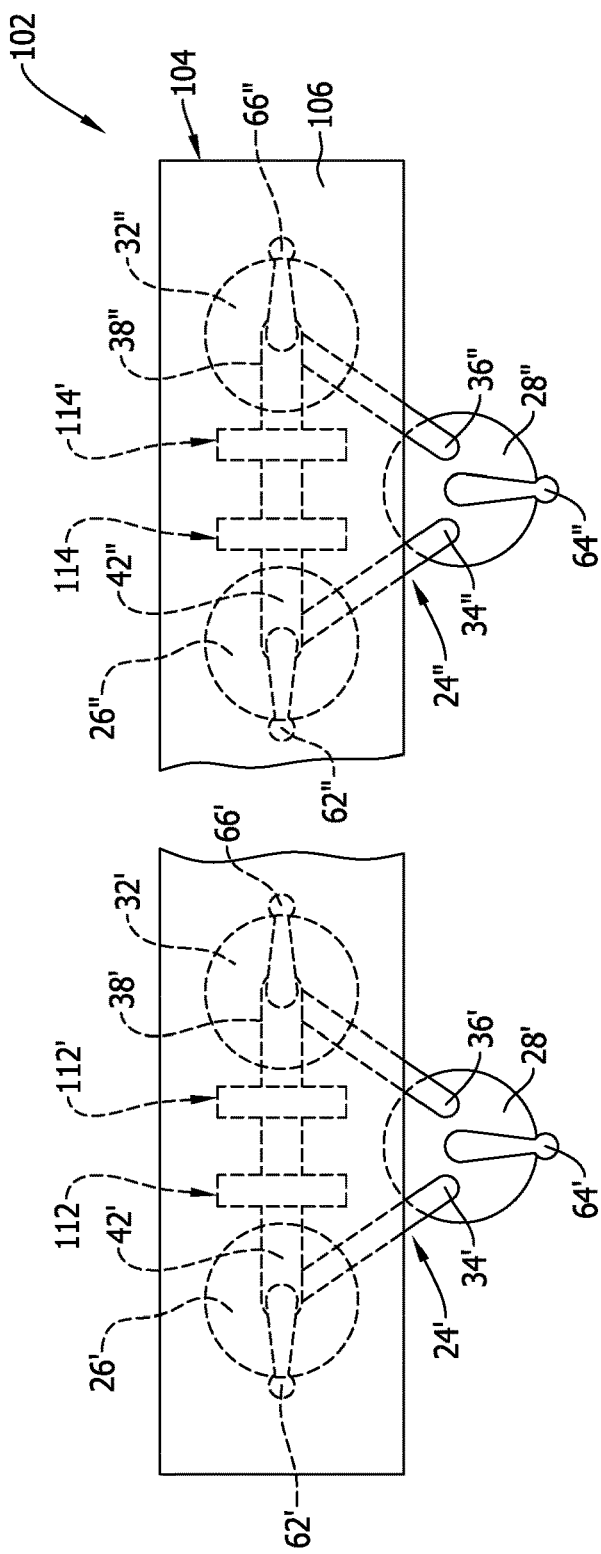
FIG. 11 is a representation of a top plan view of the second embodiment of the brace tool.
Figure 12:
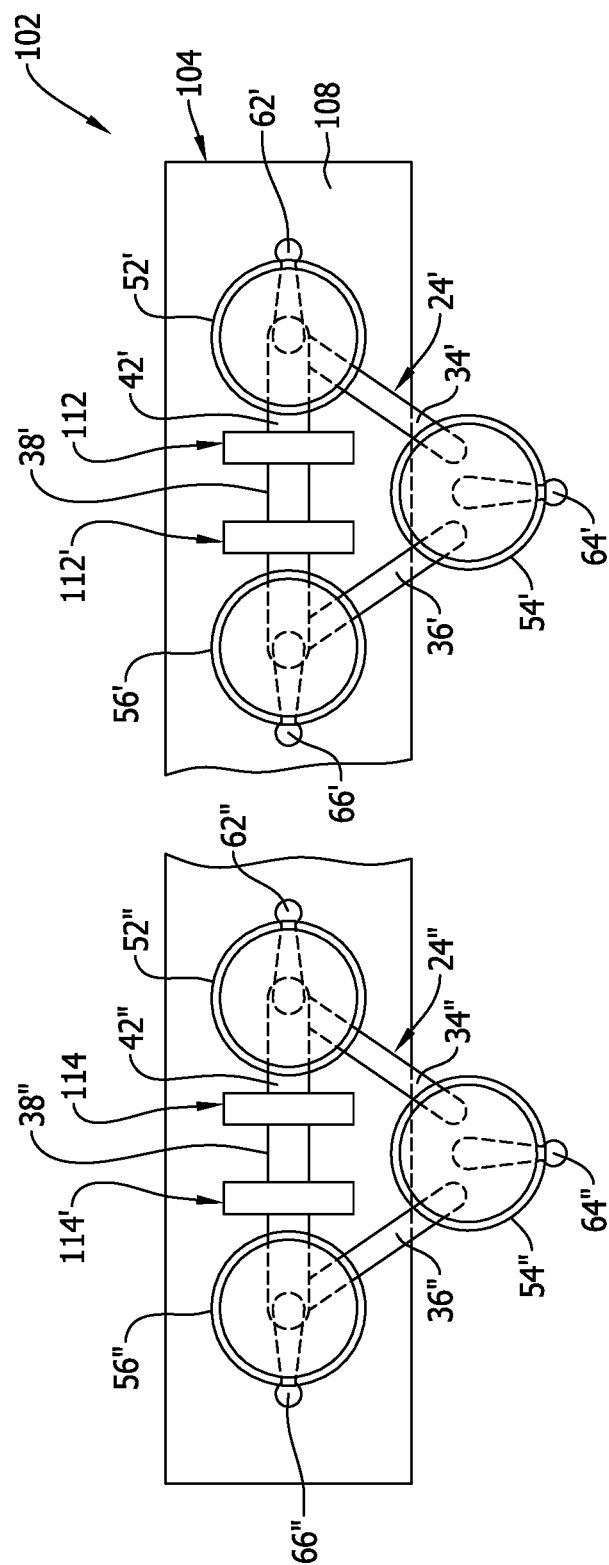
FIG. 12 is a representation of a bottom plan view of the second embodiment of the brace tool.

A second embodiment of the brace tool 102 is represented in FIGS. 10-12. The second brace tool 102 has component parts that are the same as those employed in the construction of the first brace tool 22. The component parts of the second brace tool 102 that are employed in the construction of the first brace tool 22 will therefore not be described in detail again. Because the component parts of the second brace tool 102 are substantially the same as those of the first brace tool 22, the reference numbers employed in labeling the component parts of the first brace tool 22 are also employed in labeling the component parts of the second brace tool 102, with the reference numbers being followed by a prime (') and a double prime (") in the descriptions of the component parts of the second brace tool 102 and in drawing FIGS. 10-12.

The second brace tool 102 includes a first rigid frame 24' and a second rigid frame 24". The rigid frames 24', 24" of the second brace tool 102 have constructions that are substantially the same as the frame 24 of the first brace tool 22.

One of the frames 24' is constructed with a first bar 34' and a second bar 36' on the top of the frame 24'. The first bar 34' has an elongate, straight configuration that connects the top of the first apex end 26' of the frame 24' to the top of the second apex end 28' of the frame 24'. The frame 24' second bar 36' also has an elongate, straight configuration that connects the top of the second apex end 28' of the frame to the third apex end 32' of the frame.

The second of the two frames 24" has a first bar 34" and a second bar 36" at the top of the frame 24". The first bar 34" has an elongate, straight configuration that connects the top of the first apex end 26" of the frame 24" to a top of the second apex end 28" of the frame. The frame 24" second bar 36" also has an elongate, straight configuration that connects a top of the second apex end 28" of the frame 24" to a top of the third apex end 32" of the frame.

A shaft 38' is also provided on the first frame 24' of the two frames. The shaft 38' extends between the top surface of the first apex end 26' of the first frame 24' and the top surface of the third apex end 32' of the first frame 24'.

A shaft 38" is also provided on the second frame 24" of the two frames. The shaft 38" extends between the top surface of the first apex end 26" of the second frame 24" and the top surface of the third apex end 32" of the frame 24".

As in the first described embodiment of the brace tool 22, although the two frames 24', 24" represented in FIGS. 10-12 have general, triangular configurations, the frames could have other configurations. For example, the frames could be rectangular, or have a general Y-shaped configuration.

There are a plurality of suction cups 52', 54', 56' secured to the bottom of the first frame 24' of the two frames. The plurality of suction cups 52', 54', 56' have respective manual handles 62', 64', 66'. A plurality of suction cups 52", 54", 56" are also secured to the bottom of the second of the two frames 24". These suction cups also have respective manual handles 62", 64", 66". The suction cups of the two frames 24', 24" are operated in the same manner and function in the same manner as the suction cups associated with the frame 24 of the first described base tool 22.

The second embodiment of the base tool 102 also includes a platform 104. The platform 104 of the second embodiment of the brace tool 102 differs from the platform 72 of the first embodiment of the brace tool 22 in that the platform 104 is substantially longer than the platform 72 of the first embodiment of the brace tool 22. For example, the platform 104 could be four feet long, or six feet or eight feet long. The only drawback of the platform having a longer length is that it may be difficult for one person to carry. The platform 104 is constructed of a rigid material that provides the platform with sufficient strength to support the weight of at least one person on the platform. The platform 104 could be constructed of material that provides the platform with sufficient strength to support the weight of two or more people on the platform. The platform 104 is represented in drawing FIGS. 10-12 as having a rectangular configuration with a top, brace surface 106 and an opposite bottom surface 108. The top surface 106 and bottom surface 108 are substantially flat and planar and are parallel to each other. A non-slip surface could be provided on the top surface 106. The top surface 106 is provided with length and width dimensions that enable at least one person using the brace tool 102 to easily sit, kneel, stand or in some manner support themselves on the top surface 106, and enable the person to walk along the length of the top surface 106.

First support blocks 112, 112' are secured to the bottom surface 108 of the platform 104 and secure the platform 104 to the shaft 38' of the first frame 24' of the two frames. Second support blocks 114, 114' are also secured to the bottom surface 108 of the platform 104 and mount the platform 104 to the shaft 38" of the second frame 24" of the two frames. Each of the support blocks 112, 112', 114, 114' includes a base with a semi-circular surface, a cap with a semi-circular surface, and threaded fasteners that secure the base and the cap of each of the support blocks together in the manner described earlier with reference to the support blocks 82, 82' of the first described brace tool 22. The support blocks 112, 112', 114, 114' attach the platform 104 to the two frames 24', 24" with the center axes of the respective frame shafts 38', 38" being coaxial. The support blocks 112, 112', 114, 114' have the same constructions, are operated in the same manner, and function in the same manner as the support blocks 82, 82' employed in the construction of the first brace tool 22. As explained earlier, the constructions of the support blocks 112, 112', 114, 114' enable the platform 104 to be adjustably rotated or moved in an arc around the shafts 38', 38".

In using the second brace tool 102, the platform 104 is first adjustably moved to a desired orientation relative to the frames 24', 24". The platform 24 is then secured in the desired orientation relative to the frames 24', 24" by tightening the threaded fasteners of the support blocks 112, 112', 114, 114'.

The second brace tool 102 is then positioned on a flat surface 14' adjacent an inclined surface 12' above which overhead work is to be performed, as represented in FIG. 10. Typically, the second brace tool 102 will be positioned adjacent the inclined surface 12' with the length of the platform 104 substantially parallel with the length of the inclined surface and perpendicular to the inclination of the inclined surface.

The suction cups on the frames 24', 24" are then secured to the flat surface 14 by manually manipulating the handles of the suction cups.

As represented in FIG. 10, the person 10' using the second brace tool 102 to perform overhead work above the inclined surface 12' can then stand, kneel or sit on the top surface 106 of the platform 104, or otherwise support themself on the platform and on the inclined surface 12' to perform the overhead work, and also can walk along the top surface 106 to a desired location.

When the overhead work is completed, the suction cups of the second brace tool 102 can be released and the second brace tool 102 moved to another work location as described earlier with regard to the first brace tool 22.

In the above manner, the second brace tool 102 eliminates the person 10' from constantly sliding down the inclined surface 12' while performing the overhead work above the inclined surface. The second brace tool 102 also eliminates the constant repositioning of the person 10' performing the overhead work above the inclined surface 12'. The length of the second brace tool 102 enables the person 10' to move along the length of the inclined surface 12' by walking along the top surface 106 of the second brace tool 102. The second brace tool 102 thereby provides an ergonomically comfortable environment for performing overhead work above an inclined surface 12' and reduces the time required for the overhead work.

As various modifications could be made in the construction of the brace tool 22 and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

What is claimed:

1. A brace tool comprising:
   a rigid frame, the frame having a top and a bottom on an opposite side of the frame from the top;
   a shaft secured to the top of the frame, the shaft having an exterior surface;
   a first suction cup and a second suction cup secured to the bottom of the frame;
   a platform having a top brace surface and an opposite bottom surface, the top brace surface having a length dimension and a width dimension, and the top brace surface being configured to be engaged against by a person using the brace tool with the person supporting themselves on the top brace surface when the first suction cup and the second suction cup are secured to a separate surface;
   a first support block secured to the bottom surface of the platform, the first support block having surfaces that engage around the exterior surface of the shaft and thereby mount the platform to the shaft with the length dimension of the top brace surface extending along the shaft, engagement of the surfaces of the first support block around the exterior surface of the shaft being adjustable between the surfaces of the first support block engaging loosely against the exterior surface of the shaft enabling the platform to be adjustably positioned relative to the frame by moving the platform around the shaft, and the surfaces of the first support block being firmly secured around the exterior surface of the shaft whereby the platform is firmly secured at a desired orientation relative to the frame;

a second support block secured to the bottom surface of the platform, the second support block having surfaces that engage around the exterior surface of the shaft and thereby mount the platform to the shaft with the length dimension of the top brace surface extending along the shaft, engagement of the surfaces of the second support block around the exterior surface of the shaft being adjustable between the surfaces of the second support block engaging loosely against the exterior surface of the shaft enabling the platform to be adjustably positioned relative to the frame by moving the platform around the shaft, and the surfaces of the second support block being firmly secured around the exterior surface of the shaft whereby the platform is firmly secured at a desired orientation relative to the frame; and, the frame being one of two frames having same constructions, the two frames being mounted to the platform at opposite ends of the platform.

2. A brace tool comprising:

a rigid frame, the frame having a top and a bottom on an opposite side of the frame from the top;

a shaft secured to the top of the frame, the shaft having an exterior surface;

a first suction cup and a second suction cup secured to the bottom of the frame;

a platform having a top brace surface and an opposite bottom surface, the top brace surface having a length dimension and a width dimension, and the top brace surface being configured to be engaged against by a person using the brace tool with the person supporting themselves on the top brace surface when the first suction cup and the second suction cup are secured to a separate surface;

a first support block secured to the bottom surface of the platform, the first support block having surfaces that engage around the exterior surface of the shaft and thereby mount the platform to the shaft with the length dimension of the top brace surface extending along the shaft, engagement of the surfaces of the first support block around the exterior surface of the shaft being adjustable between the surfaces of the first support block engaging loosely against the exterior surface of the shaft enabling the platform to be adjustably positioned relative to the frame by moving the platform around the shaft, and the surfaces of the first support block being firmly secured around the exterior surface of the shaft whereby the platform is firmly secured at a desired orientation relative to the frame;

a second support block secured to the bottom surface of the platform, the second support block having surfaces that engage around the exterior surface of the shaft and thereby mount the platform to the shaft with the length dimension of the top brace surface extending along the shaft, engagement of the surfaces of the second support block around the exterior surface of the shaft being adjustable between the surfaces of the second support block engaging loosely against the exterior surface of the shaft enabling the platform to be adjustably positioned relative to the frame by moving the platform around the shaft, and the surfaces of the second support block being firmly secured around the exterior surface of the shaft whereby the platform is firmly secured at a desired orientation relative to the frame; and, the frame having a triangular configuration with a first apex end, a second apex end and a third apex end;

the frame having a first bar on the top of the frame, the first bar having an elongate, straight configuration, the first bar connecting between a top of the first apex end of the frame and a top of the second apex end of the frame;

the frame having a second bar, the second bar having an elongate, straight configuration, the second bar connecting between the top of the second apex end of the frame and a top of the third apex end of the frame; and, the shaft extending between the top of the first apex end of the frame and the top of the third apex end of the frame.

3. A brace tool comprising:

a rigid frame, the frame having a top, the frame having a bottom on an opposite side of the frame from the top;

a shaft secured to the top of the frame, the shaft having a cylindrical exterior surface;

at least one suction cup secured to the bottom of the frame;

a platform mounted on the shaft for movement of the platform around the shaft, the platform having a brace surface that is configured to be engaged against by a person using the brace tool with the person supporting themself on the brace surface;

a support block on the platform, the support block being attached on the shaft and mounting the platform on the shaft, the support block being adjustable to loosely attach the support block on the shaft enabling the support block and the platform to be moved together around the shaft, and to firmly attach the support block on the shaft preventing the support block and the platform from being moved together around the shaft;

the platform having a bottom surface, the bottom surface the platform being on an opposite side of the platform from the brace surface;

the support block being secured to the bottom surface of the platform;

the support block having a base secured to the bottom surface of the platform that secures the support block to the bottom surface of the platform, the base having a semi-circular surface on an opposite side of the base from the bottom surface of the platform;

a cap removably attached to the base, the cap having a semi-circular surface that opposes the semi-circular surface of the base when the cap is removably attached to the base, the semi-circular surface of the base and the semi-circular surface of the cap extending around the shaft and attaching the support block on the shaft, the cap being adjustable toward the base to firmly engage the semi-circular surface of the base and the semi-circular surface of the cap around the shaft to firmly attach the support block on the shaft preventing the support block and the platform from being moved together around the shaft, and the cap being adjustable away from the base to loosely engage the semi-circular surface of the base and the semi-circular surface of the cap around the shaft enabling the support block and the platform to be moved together around the shaft.

4. The brace tool of claim 3, further comprising:

a second support block secured to the bottom surface of the platform, the first support block and the second support block having same constructions.

5. A brace tool comprising:
a rigid frame, the frame having a top and a bottom on an opposite side of the frame from the top;
a shaft secured to the top of the frame, the shaft having an exterior surface;
a first suction cup, a second suction cup, and a third suction cup, each of the suctions cups being secured to the bottom of the frame, and each of the suction cups being arranged in a triangular configuration with respect to each other;
a platform having a top brace surface and an opposite bottom surface, the top brace surface having a length dimension and a width dimension, and the top brace surface being configured to be engaged against by a person using the brace tool with the person supporting themselves on the top brace surface when the first suction cup and the second suction cup are secured to a separate surface;
a first support block secured to the bottom surface of the platform, the first support block having surfaces that engage around the exterior surface of the shaft and thereby mount the platform to the shaft with the length dimension of the top brace surface extending along the shaft, engagement of the surfaces of the first support block around the exterior surface of the shaft being adjustable between the surfaces of the first support block engaging loosely against the exterior surface of the shaft enabling the platform to be adjustably positioned relative to the frame by moving the platform around the shaft, and the surfaces of the first support block being firmly secured around the exterior surface of the shaft whereby the platform is firmly secured at a desired orientation relative to the frame;
a second support block secured to the bottom surface of the platform, the second support block having surfaces that engage around the exterior surface of the shaft and thereby mount the platform to the shaft with the length dimension of the top brace surface extending along the shaft, engagement of the surfaces of the second support block around the exterior surface of the shaft being adjustable between the surfaces of the second support block engaging loosely against the exterior surface of the shaft enabling the platform to be adjustably positioned relative to the frame by moving the platform around the shaft, and the surfaces of the second support block being firmly secured around the exterior surface of the shaft whereby the platform is firmly secured at a desired orientation relative to the frame.

6. The brace tool of claim 5, further comprising:
the shaft extending between the first suction cup and the second suction cup; and,
the platform extending over the first suction cup and the second suction cup.

7. A brace tool comprising:
a rigid frame, the frame having a top, the frame having a bottom on an opposite side of the frame from the top;
a shaft secured to the top of the frame;
at least two suction cups secured to the bottom of the frame;
a platform mounted on the shaft, the platform having a length that is aligned with the at least two suction cups, the platform having a brace surface that is configured to be engaged against by a person using the brace tool with the person configured to be engaged against by a person using the brace tool with the person supporting themself on the brace surface;
a support block on the platform, the support block being attached on the shaft and mounting the platform on the shaft, the support block being adjustable to loosely attach the support block on the shaft enabling the support block and the platform to be moved together around the shaft, and to firmly attach the support block on the shaft preventing the support block and the platform from being moved together around the shaft;
the platform having a bottom surface, the bottom surface of the platform being on an opposite side of the platform from the brace surface;
the support block being secured to the bottom surface of the platform;
the support block having a base secured to the bottom surface of the platform that secures the support block to the bottom surface of the platform, the base having a semi-circular surface on an opposite side of the base from the bottom surface of the platform;
a cap removably attached to the base, the cap having a semi-circular surface that opposes the semi-circular surface of the base when the cap is removably attached to the base, the semi-circular surface of the base and the semi-circular surface of the cap extending around the shaft and attaching the support block on the shaft, the cap being adjustable toward the base to firmly engage the semi-circular surface of the base and the semi-circular surface of the cap around the shaft to firmly attach the support block on the shaft preventing the support block and the platform from being moved together around the shaft, and the cap being adjustable away from the base to loosely engage the semi-circular surface of the base and the semi-circular surface of the cap around the shaft enabling the support block and the platform to be moved together around the shaft.

8. The brace tool of claim 7, further comprising:
a second support block secured to the bottom surface of the platform, the first support block and the second support block having same constructions.

9. The brace tool of claim 7, further comprising:
the platform having an elongate length; and,
the frame being one of two separate frames having same constructions, the two frames being mounted to the platform at opposite ends of the platform length.

10. The brace tool of claim 7, further comprising:
the at least two suction cups being three suctions cups secured to the bottom of the frame.

11. The brace tool of claim 10, further comprising:
the three suction cups secured to the bottom of the frame being arranged in a triangular configuration.

12. The brace tool of claim 11, further comprising:
the shaft extending between two suction cups of the three suction cups; and,
the platform extending over two suction cups of the three suction cups.

13. A brace tool comprising:
a rigid frame, the frame having a triangular configuration, the frame having a top, the frame having a bottom on an opposite side of the frame from the top;
a shaft secured to the top of the frame, the shaft having a cylindrical exterior surface;
at least two suction cups secured to the bottom of the frame;
a platform constructed of a rigid material, the platform having a top, brace surface and an opposite bottom surface, the top, brace surface being planar, the top brace surface having a length dimension and a width dimension, and the top brace surface being configured to be engaged against by a person using the brace tool with the person bracing themself against the top, brace surface; and, a first support block secured to the bottom surface of the platform, the first support block having surfaces that engage around the cylindrical exterior surface of the shaft and thereby mount the platform to the shaft with the length dimension of the top brace surface extending along the shaft, engagement of the surfaces of the first support block around the cylindrical exterior surface of the shaft being adjustable between the surfaces of the first support block engaging loosely against the cylindrical exterior surface of the shaft enabling the platform to be adjustably positioned relative to the frame by moving the platform in an arc around the shaft, and the surfaces of the first support block being firmly secured around the cylindrical exterior surface of the shaft whereby the platform is firmly secured at a desired orientation relative to the frame.

14. The brace tool of claim 13, further comprising:
the at least two suction cups being two of three suction cups secured to the bottom of the frame.

15. The brace tool of claim 13, further comprising:
the frame having a triangular configuration with a first apex end, a second apex end and a third apex end;
the frame having a first bar on the top of the frame, the first bar having an elongate, straight configuration, the first bar connecting a top of the first apex end of the frame to a top of the second apex end of the frame;
the frame having a second bar, the second bar having an elongate, straight configuration, the second bar connecting the top of the second apex end of the frame to a top of the third apex end of the frame; and,
the shaft extending between the top of the first apex end of the frame and the top of the third apex end of the frame.

* * * * *

UNITED STATES PATENT AND TRADEMARK OFFICE
CERTIFICATE OF CORRECTION

PATENT NO. : 10,190,325 B2  
APPLICATION NO. : 15/235550  
DATED : January 29, 2019  
INVENTOR(S) : Kurt P. Hrubrant and William R. White Page 1 of 1

It is certified that error appears in the above-identified patent and that said Letters Patent is hereby corrected as shown below:

In the Claims

Column 11, Lines 64-65, delete: "configured to be engaged against by a person using the brace tool with the person"

Signed and Sealed this  
Twenty-sixth Day of March, 2019

Andrei Iancu  
*Director of the United States Patent and Trademark Office*